Patented Aug. 28, 1951

2,566,225

UNITED STATES PATENT OFFICE 2,566,225

PROCESS FOR PREPARING SUBSTITUTED MELAMINES

Johnstone S. Mackay, Old Greenwich, and Joseph H. Faden, Stamford, Conn., assignors to American Cyanamid Company, New York, N. Y., a corporation of Maine No Drawing. Application May 1, 1947,
Serial No. 745,248

8 Claims. (Cl. 260—249.6)

The present invention relates to the preparation of substituted melamines by heating a urea with a primary or secondary amine.

An object of this invention is to prepare substituted melamines by an economical process involving only simple apparatus and procedures.

Another object of this invention is to prepare substituted melamines by treating a urea with a primary or secondary, alkyl or aryl amine.

Still another object of the invention is to prepare such substituted melamines by simply heating a urea with such an amine at somewhat elevated temperatures in a closed reaction vessel.

Other objects of the invention will be apparent from the discussion that follows hereinafter.

In U. S. Serial No. 495,216, filed July 17, 1943, the present applicants disclose a process for preparing melamine itself by heating urea and/or its thermal decomposition products in the presence of ammonia, formed in the process and/or extraneously added, at a temperature of at least 270° C. in a closed reactor. In carrying out the process therein described urea or substituted ureas such as guanylurea, cyanourea, and biuret may be heated alone in the aforementioned closed reactor to produce the desired melamine, or added ammonia may be employed if desired, its use providing appreciably higher yields of melamine at the lower temperatures. Long periods of heating, of the order of 6 hours, are required to obtain maximum yields of melamine at temperatures somewhat above 270° C., heating periods of only about ½ hour are required at temperatures above 400° C. and of only about 10 minutes at temperatures above 500° C. Also, it is therein disclosed that temperatures appreciably in excess of 600° C. should be avoided inasmuch as at temperatures substantially above this temperature decomposition of the melamine produced by the process begins to become appreciable.

It has now been discovered that substituted melamines may be prepared by heating a urea with a primary or secondary, alkyl or aryl amine at a temperature of at least 300° C., preferably within the range of 300°–600° C. and more preferably at a temperature within the range of 350°–500° C., in a closed reaction vessel. Such substituted melamines are shown graphically by the following general formula:

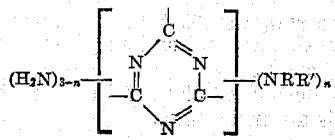

In the above formula $n$ represents an integer and is at least 1 and not more than 3, R represents an alkyl or aryl radical and R' represents hydrogen, or an alkyl or aryl radical.

Illustrative examples of such radicals that R and R' may represent are: alkyl, e. g., methyl, ethyl, propyl, isopropyl, allyl, butyl, secondary butyl, crotyl, methallyl, ethallyl, heptyl, ischeptyl, octyl, decyl, isoamyl, octadecyl, and the like, including cycloalkyl, or alicyclic, e. g., cyclopentyl, cyclopentenyl, cyclohexyl, cyclohexenyl, cycloheptyl and the like, and also aryl-substituted alkyl, e. g., benzyl, phenylethyl, phenylisopropyl, cinnamyl, and the like; aryl, e. g., phenyl, diphenyl, naphthyl, and the like, including alkyl substituted aryl, e. g., tolyl, xylyl, methylphenyl, ethylphenyl, propylphenyl, allylphenyl, 2-butenylphenyl, and the like; and their homologues.

Such ureas as may be employed in the process of the invention are urea itself, cyanourea, dicyanourea, biuret, guanylurea, N-alkyl and N-aryl substituted ureas, and the like. In addition, the process of the invention contemplates the use of the thermal decomposition products of such ureas. For example, when urea is heated in the presence of water it is decomposed to form carbon dioxide and ammonia, when slowly heated to 150°–160° C. a mol of ammonia is split out from 2 mols of urea to yield a mol of biuret, and at somewhat higher temperatures cyanic acid and ammonia are formed, said cyanic acid polymerizing immediately to cyanuric acid. Also, ammeline, ammelide and ammonia are formed when urea is heated at 190° C.–200° C. Similar thermal decomposition products are obtained from the aforementioned substituted ureas.

Examples of the N-alkyl and N-aryl substituted ureas which may be employed in the process are: allyl, N-allyl-N'-phenyl-, benzyl-, butyl-, secbutyl-, ter-butyl-, N,N-diethyl-, N,N'-diethyl-, N,N-dimethyl-, N,N'-dimethyl-, N,N-diphenyl-, ethyl-, N-ethyl-N'-phenyl-, isoamyl-, isobutyl-, methyl-, phenyl-, propyl-, o-tolyl-, p-tolyl-, m-tolylurea and the like.

Illustrative examples of primary and secondary amines that may be used in practicing the invention are: aniline, octyl amine, methyl amine, dimethyl amine, ethyl amine, methyl ethyl amine, di-ethyl amine, propyl amine, isopropyl amine, di-propyl amine, allyl amine, di-isopropyl amine, methyl propyl amine, ethyl propyl amine, crotyl amine, butyl amine, isobutyl amine, secondary butyl amine, di-butyl amine, butyl ethyl amine, decyl amine, octadecyl amine, cyclohexyl amine, cyclopentyl amine, cyclohexenyl amine, pentyl amine, para-chloroaniline, toluidine, xylidine, N- methyl aniline, benzyl amine, allylphenyl amine, naphthyl amine, phenethylamine, ethylphenyl amine, N-butyl toluidine and the like.

If urea, cyanourea, dicyanourea, biuret, guanyl-urea and the like are heated in the presence of one or more of the aforementioned amines the product obtained is predominantly an N-mono- or disubstituted melamine, i. e., one containing only one NRR' group, whereas if the urea employed is an N-alkyl or N-aryl substituted urea the substituted melamines contained are predominantly the NN'- and NN'N''-substituted melamines. Of course, using a greater proportion of amine in carrying out the process with the aforementioned group of ureas, i. e., those which do not carry alkyl or aryl substituents, a greater proportion of the NN'- and NN'N''-substituted melamines are provided. For example, 60 g. of urea and 25 g. of n-butylamine were heated in a 300 cc. autoclave at 400° C. for 2 hours. Thereafter, the autoclave was cooled, vented and the solid product was discharged. The product proved to be a mixture of melamine and N-n-butyl melamine with small proportion of NN'-di-n-butyl melamine. Separation of the mixture into its respective components provided 4.7 g. of melamine, 12.9 g. of N-n-butyl melamine and 1.0 g. of NN'-di-n-butyl melamine. In another experiment 40 g. of N-n-butyl urea and 39 g. of n-butylamine were heated at 350° C. for 2 hours in a 300 cc. autoclave. Separation of the reaction mixture provided about 16 g. of NN'-di-n-butyl melamine and 4.1 g. of NN'N''-tri-n-butyl melamine. In still another experiment 50 g. of aniline and 30 g. of urea were heated in a 300 cc. autoclave at 350° C. for 2 hours to obtain a mixture of N-, NN'-di-, and NN'N''-triphenylmelamine. While the optimum heating period was found to be 2 hours when employing a temperature of 350° C., it was found that shorter heating periods could be employed using higher temperatures, 20 minutes being suitable at about 400° C. and 10 minutes being suitable at about 500° C.

While the separation of melamine from reaction mixtures in which none of the alkyl or aryl substituted melamines are present may be readily effected by simply extracting with hot water, the separation is somewhat complicated when such substituted melamines are present. Generally, the alkyl substituted melamines are selectively extracted away from melamine with an alcohol such as ethanol or n-butanol. The N-alkyl melamines, being less soluble in such alcohols, are separated from the more highly substituted alkyl melamines by fractional crystallization. The NN'- and NN'N''-alkyl substituted melamines are separated from each other on the basis of the relatively greater solubility of the hydrochlorides of the former in ethyl ether. Alternatively, such a reaction mixture may be extracted with ethyl ether to remove such NN'- and NN'N''-alkyl substituted melamines, and thereafter the residue from this extraction may be extracted with ethanol to remove such N-alkyl substituted melamines, leaving melamine as the residue. With the aryl substituted melamines, dioxane may be employed to separate such substituted melamines from the melamine. The aryl substituted melamines are recovered by removing the dioxane, and the dry mixture thereof is extracted with an alcohol such as ethanol, n-butanol and the like to remove the N-aryl substituted melamines. The residue of NN'- and NN'N''-aryl substituted melamines from the alcohol extraction is then separated by converting such melamines to the corresponding hydrochlorides, that of the NN'-aryl substituted melamines being soluble in water while that of the NN'N''-aryl substituted melamines is substantially insoluble.

While the present invention has been described with particular reference to specific embodiments, it is to be understood that it is not to be limited thereto but is to be construed broadly and restricted solely by the scope of the appended claims.

What is claimed is:

1. A method of preparing a substituted melamine of the formula

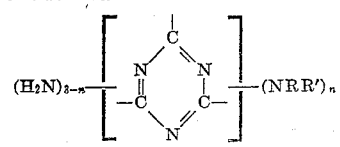

where $n$ is an integer and is at least 1 and not more than 3, R is a member of the group consisting of alkyl and aryl radicals and R' is a member of the group consisting of hydrogen, alkyl and aryl radicals, said method comprising heating a urea of the group consisting of urea and alkyl and aryl derivatives thereof with a member of the group consisting of primary and secondary, alkyl and aryl amines at a temperature of at least 300° C. in a closed reaction vessel, the reaction being conducted in the absence of a catalyst.

2. A method of preparing a substituted melamine of the formula

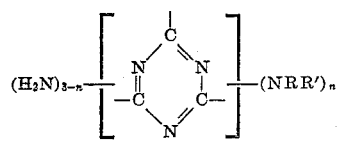

where $n$ is an integer and is at least 1 and not more than 3, R is a member of the group consisting of alkyl and aryl radicals and R' is a member of the group consisting of hydrogen, alkyl and aryl radicals, said method comprising heating a urea of the group consisting of urea and alkyl and aryl derivatives thereof with a member of the group consisting of primary and secondary, alkyl and aryl amines at a temperature within the range of 300°–600° C. in a closed reaction vessel, the reaction being conducted in the absence of a catalyst.

3. A method of preparing a substituted melamine of the formula

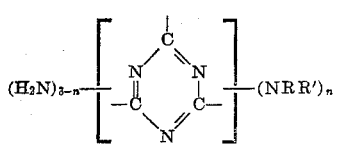

where $n$ is an integer and is at least 1 and not more than 3, R is a member of the group consisting of alkyl and aryl radicals and R' is a member of the group consisting of hydrogen, alkyl and aryl radicals, said method comprising heating a urea of the group consisting of urea and alkyl and aryl derivatives thereof with a member of the group consisting of primary and secondary, alkyl and aryl amines at a temperature within the range of 350°–500° C. in a closed reaction vessel, the reaction being conducted in the absence of a catalyst.

4. The method of claim 3 in which the amine reactant is an aryl amine.

5. The method of claim 3 in which the amine reactant is an alkyl amine.

6. The method of claim 3 in which the amine reactant is aniline.

7. The method of claim 3 in which the amine reactant is n-butyl amine.

8. The method of claim 3 in which urea itself is the urea employed.

JOHNSTONE S. MACKAY.
JOSEPH H. PADEN.

REFERENCES CITED

The following references are of record in the file of this patent:

UNITED STATES PATENTS

| Number | Name | Date |
|---|---|---|
| 2,222,350 | Keller | Nov. 19, 1940 |
| 2,228,161 | Zerweck | Jan. 7, 1941 |
| 2,253,528 | Olin | Aug. 26, 1941 |
| 2,374,485 | Haury | Apr. 24, 1945 |
| 2,396,193 | Paden | Mar. 5, 1946 |

FOREIGN PATENTS

| Number | Country | Date |
|---|---|---|
| 583,504 | Great Britain | Dec. 19, 1946 |